(12) United States Patent
Katto et al.

(10) Patent No.: US 12,639,787 B2
(45) Date of Patent: May 26, 2026

(54) VIDEO SUPER-RESOLUTION METHOD, PROGRAM, AND DEVICE

(71) Applicant: WASEDA UNIVERSITY, Tokyo (JP)

(72) Inventors: Jiro Katto, Tokyo (JP); Shion Komatsu, Tokyo (JP); Heming Sun, Tokyo (JP); Yutaka Katsuyama, Tokyo (JP); Toshio Sato, Tokyo (JP); Takuro Sato, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 299 days.

(21) Appl. No.: 18/599,086

(22) Filed: Mar. 7, 2024

(65) Prior Publication Data

US 2024/0331089 A1 Oct. 3, 2024

(30) Foreign Application Priority Data

Mar. 27, 2023 (JP) ................................. 2023-049863

(51) Int. Cl.
*G06T 3/4053* (2024.01)
*G06T 7/20* (2017.01)
*H04N 5/14* (2006.01)

(52) U.S. Cl.
CPC .............. *G06T 3/4053* (2013.01); *G06T 7/20* (2013.01); *H04N 5/145* (2013.01)

(58) Field of Classification Search
None
See application file for complete search history.

(56) References Cited

U.S. PATENT DOCUMENTS

2021/0097646 A1* 4/2021 Choi ........................ G06N 3/08
2022/0103823 A1 3/2022 Jiang et al.

FOREIGN PATENT DOCUMENTS

JP 2010134582 A 6/2010
JP 2023505481 A 2/2023
WO WO-2024137310 A1 * 6/2024 ......... G01N 15/1456

OTHER PUBLICATIONS

Video Super-resolution with Temporal Group Attention, by Isobe et al, arXiv:2007.10595v1 [cs.CV] Jul. 21, 2020 (Year: 2020).*
Ishikawa et al. "High-Speed Vision", Journal of the Robotics Society of Japan, vol. 23, No. 3, pp. 274-277, Mar. 2005. 8pp.

(Continued)

*Primary Examiner* — Vikkram Bali
(74) *Attorney, Agent, or Firm* — HAUPTMAN HAM, LLP

(57) ABSTRACT

A video super-resolution device includes a down-sampler, video super-resolvers, and a selecting/averaging unit. The down-sampler divides an input low-resolution video into a plurality of frame rates. The video super-resolvers are video super-resolvers trained at different frame rates, and perform super-resolution of the low-resolution video. The selecting/averaging unit selects a video super-resolver according to the magnitude of an optical flow obtained as a result of video super-resolution. Specifically, in a case where the optical flow has a value smaller than 0.5 pixels, the selecting/averaging unit makes selection such as not adopting a result of video super-resolution at a high frame rate. Finally, the selecting/averaging unit obtains a mean value of the selected video super-resolution result, and outputs a final high-resolution video.

6 Claims, 13 Drawing Sheets

(56) References Cited

OTHER PUBLICATIONS

Machida et al. "A 2.1Mpixel organic-film stacked RGB-IR image sensor with electrically controllable IR sensitivity", IEEE ISSCC 2017, Feb. 6, 2017. 3pp.

Hirata et al. "A 1-inch 17Mpixel 1000fps Block-Controlled Coded-Exposure Back-Illuminated Stacked CMOS Image Sensor for Computational Imaging and Adaptive Dynamic Range Control", IEEE ISSCC 2022, Feb. 2021, vol. 4, 7pp.

Sim et al. "XVFI: eXtreme Video Frame Interpolation", IEEE ICCV 2021, Nov. 2021. 10pp.

Irani et al. "Improving resolution by image registration", CVGIP, vol. 53, No. 3, pp. 231-239, May 1991. 9pp.

Freeman et al. "Example-based super-resolution", IEEE Computer Graphics and Applications, vol. 22, No. 2, pp. 56-65, Mar./Apr. 2002. 10pp.

Dong et al. "Image Super-Resolution Using Deep Convolutional Networks", IEEE Transactions on Pattern Analysis and Machine Intelligence, vol. 38, No. 2, pp. 295-307, Jul. 2015. 14pp.

Liu et al. "Video super-resolution based on deep learning: a comprehensive survey", Artificial Intelligence Review, vol. 55, pp. 5981-6035, Mar. 2022. 33pp.

Shimizu et al. "iPhone 240fps Video Dataset for Various Model Training Tasks", IEEE ICCE 2023, Jan. 2023. 5pp.

* cited by examiner

FIG. 4

REFERENCE FRAME    CORRESPONDING FRAME

REFERENCE FRAME          CORRESPONDING FRAME

FIG. 13

| PRODUCT/DEVICE NAME | COMPANY NAME | SPATIAL RESOLUTION | TEMPORAL RESOLUTION |
|---|---|---|---|
| ACTION CAMERA | GoPro | 2K(1080P) | 240fps |
| DIGITAL CAMERA | SONY | 2K(1080P) | 960fps |
| SMARTPHONE | Huawei | 720P | 7680fps |
| STACKED CMOS IMAGE SENSOR (ISSCC 2017) | SONY | 2K(1080P) | 960fps |
| STACKED CMOS IMAGE SENSOR (ISSCC 2021) | NIKON | 4K(2160P) | 1000fps |

VIDEO SUPER-RESOLUTION METHOD, PROGRAM, AND DEVICE

RELATED APPLICATIONS

The present application claims the benefit of priority from the prior Japanese patent application 2023-049863 filed on Mar. 27, 2023. The entire contents of the above-captioned applications are incorporated herein by reference.

BACKGROUND OF THE INVENTION

1. Technical Field

Aspects of embodiments of the present invention relates to a video super-resolution method, program, and device. One aspect of embodiments particularly relates to a video super-resolution method and device that create image groups with different frame rates, perform motion estimation for each of the created image groups, select an image group with a motion amount suitable for super-resolution, and perform video super-resolution, with regard to a video super-resolution technology for increasing the spatial resolution of an input video. Another aspect of embodiments relates to a video super-resolution method and device that select an image group on a region basis, a block basis, or a pixel basis in addition to an image basis (frame basis), with regard to the above video super-resolution. In addition, the embodiments do not depend on a specific video super-resolution method, and can be applied to any video super-resolution method.

2. Description of the Related Art

As a recent trend related to video signals, there is an improvement in temporal resolution. In ITU-R BT.2020 and ITU-R BT.2100, which is a high dynamic range (HDR) extended version thereof, 4K/8K spatial resolution videos are standardized, and a maximum of 120 frames per second (fps) is standardized as temporal resolution. Furthermore, a 4K resolution 240 fps video transmission system has also been developed. This improvement in temporal resolution has originally been introduced to improve smoothness and blurring of motion along with expansion of spatial resolution. However, this improvement shortens frame storage time for high-efficiency compression, and resultantly contributes to reduction in delay of a video communication system targeted by the present research and development.

In addition, in smartphones and digital cameras, a high-speed photographing mode called super slow motion has recently become widespread. Currently, an image of one frame cannot be taken out in real time, and a compressed file is generated in a device and then downloaded. For example, a 1080P resolution 240 fps product (GoPro Hero9), a 1080P resolution 960 fps product (Sony RX100V), and a 720P resolution 7680 fps product (Huawei P40 Pro 5G) are sold as a maximum frame rate.

High-speed cameras for special applications such as destruction testing and combustion analysis and for research and development applications have existed for a long time. In particular, Ishikawa et al. have developed various high-speed image processing systems using an imaging device exceeding 1000 fps, which are called high-speed vision systems (e.g., Masatoshi Ishikawa: "High-Speed Vision", Journal of the Robotics Society of Japan, Vol. 23, No. 3, pp-274-277, March 2005). However, their spatial resolution is limited to a relatively low resolution, and their application is also limited to robot and factory applications.

As described above, temporal resolution has been dramatically improved in broadcasting/communication, and consumer applications. This owes much to the development of semiconductor technology of a stacked CMOS image sensor in which an imaging system and an arithmetic system are separated. At the international conference ISSCC called the Olympics of semiconductors, Sony disclosed a 2K resolution 960 fps stacked image sensor in 2017, and Nikon disclosed a 4K/HDR 1000 fps stacked image sensor in 2021 (e.g., S. Machida et al.: "A 2.1 Mpixel organic-film stacked RGB-IR image sensor with electrically controllable IR sensitivity", IEEE ISSCC 2017 February 2017. and T. Hirata et al.: "A 1-inch 17 Mpixel 1000 fps Block-Controlled Coded-Exposure Back-Illuminated Stacked CMOS Image Sensor for Computational Imaging and Adaptive Dynamic Range Control", IEEE ISSCC 2021 February 2021). FIG. 13 illustrates a recent trend of cameras, smartphones, and image sensors for consumer applications. Furthermore, in 2021, KAIST, Korea proposed a 4K video dataset photographed at 1000 fps using a high-speed camera and a frame interpolation method using the dataset (e.g., H. Sim, J. Oh, and M. Kim: "XVFI: eXtreme Video Frame Interpolation", IEEE ICCV 2021 November 2021).

On the other hand, super-resolution is one of tasks related to a computer vision, and is intended to convert a given low spatial resolution image into a high spatial resolution image. Iterative back projection (IBP) method by iterative operation (e.g., M. Irani and S. Peleg: "Improving resolution by image registration", CVGIP, Vol. 53, No. 3, pp. 231-239, May 1991), Example method of learning a large number of small patches and large patches (e.g., W. T. Freeman, T. R. Jones and E. C. Pasztor: "Example-based super-resolution", IEEE Computer Graphics and Applications, Vol. 22, No. 2, pp. 56-65, August 2002), and the like have long been known. Some of them are incorporated into commercially available televisions as a resolution conversion technology. In addition, since the proposal of super-resolution convolutional neural networks (SRCNN) (e.g., C. Dong, C. C. Loy, K. He, and X. Tang: "Image Super-Resolution Using Deep Convolutional Networks", IEEE Transactions on Pattern Analysis and Machine Intelligence, Vol. 38, No. 2, pp. 295-307, June 2015), many super-resolution methods using deep learning have recently been proposed. A competition for super-resolution performance is held in a workshop called New Trends in Image Restoration and Enhancement (NTIRE) every year.

In particular, research and development on super-resolution of video signals (video super-resolution) have recently been actively promoted (e.g., H. Liu et al.: "Video super-resolution based on deep learning: a comprehensive survey", Artificial Intelligence Review, Vol. 55, pp. 5981-6035 April 2022). In video super-resolution, a super-resolution method for a still image such as the above SRCNN can be directly used. However, the performance of super-resolution can be enhanced by adding a time axis, obtaining an optical flow (motion estimation) between adjacent frames, and referring to the optical flow at the time of resolution conversion of the corresponding frame.

However, in the research and development of video super-resolution, no report has been made on high frame rate videos at 240 fps or more, and the frame rate of a common video dataset used in the above NTIRE workshop is also limited to a maximum of 60 fps. In addition, research and development using a 240 fps or 1000 fps video dataset are also limited to deblurring and frame interpolation, and no report has been made on video super-resolution. At the international conference in January 2023, the inventors made a presentation on creation of an original 240 fps video dataset and various video processing applications, and also made a report on super-resolution of a 240 fps video in the presentation (e.g., J. Shimizu et al.: "iPhone 240 fps Video Dataset for Various Model Training Tasks", IEEE ICCE 2023 January 2023). However, the gist of the presentation regarding the video super-resolution is that, unlike other video processing, the best feature is not necessarily obtained even if the frame rate is increased in the case of the video super-resolution.

SUMMARY OF THE INVENTION

JP 2010-134582 A proposes an algorithm for video super-resolution, but does not mention anything about a frame rate.

JP 2023-505481 A proposes a video compression/decoding method based on video super-resolution, but does not mention anything about a frame rate.

Masatoshi Ishikawa: "High-Speed Vision", Journal of the Robotics Society of Japan, Vol. 23, No. 3, pp-274-277, March 2005. refers to photographing and processing of a video exceeding 1000 fps, but is targeted on a video with a low spatial resolution, and makes no report on video super-resolution.

S. Machida et al.: "A 2.1 Mpixel organic-film stacked RGB-IR image sensor with electrically controllable IR sensitivity", IEEE ISSCC 2017 February 2017. and T. Hirata et al.: "A 1-inch 17 Mpixel 1000 fps Block-Controlled Coded-Exposure Back-Illuminated Stacked CMOS Image Sensor for Computational Imaging and Adaptive Dynamic Range Control", IEEE ISSCC 2021 February 2021. are reports on the development of a 2K resolution or 4K resolution 1000 fps image sensor, and make no report on video super-resolution.

H. Sim, J. Oh, and M. Kim: "XVFI: eXtreme Video Frame Interpolation", IEEE ICCV 2021 November 2021. is a proposal related to creation of a 1000 fps video dataset and frame interpolation, and makes no report on video super-resolution.

M. Irani and S. Peleg: "Improving resolution by image registration", CVGIP, Vol. 53, No. 3, pp. 231-239, May 1991, W. T. Freeman, T. R. Jones and E. C. Pasztor: "Example-based super-resolution", IEEE Computer Graphics and Applications, Vol. 22, No. 2, pp. 56-65, August 2002, and C. Dong, C. C. Loy, K. He, and X. Tang: "Image Super-Resolution Using Deep Convolutional Networks", IEEE Transactions on Pattern Analysis and Machine Intelligence, Vol. 38, No. 2, pp. 295-307, June 2015. are historical papers on still image super-resolution, and make no report on super-resolution of high frame rate videos.

H. Liu et al.: "Video super-resolution based on deep learning: a comprehensive survey", Artificial Intelligence Review, Vol. 55, pp. 5981-6035 April 2022. is a survey paper summarizing recent video super-resolution technologies, but does not mention anything about a super-resolution technology for high frame rate videos at 240 fps or more.

J. Shimizu et al.: "iPhone 240 fps Video Dataset for Various Model Training Tasks", IEEE ICCE 2023 January 2023. is an international conference paper by the inventors and mentions a problem that the performance of super-resolution of 240 fps videos is not sufficiently improved.

That is, in a case where video super-resolution of a high frame rate video at 240 fps or more is attempted, the above-described conventional technologies have a problem that the video super-resolution often does not function effectively.

Therefore, an object of the embodiments is to provide a video super-resolution method, program, and device that achieve a stable feature improvement even in a super-high frame rate video.

In order to achieve the above object, an aspect of the embodiments provides the following video super-resolution method, program, and device.

Aspects of a first embodiment include a video super-resolution method including: step of creating image groups having different frame rates from an input video; a step of performing motion estimation for each of the created image groups; a step of selecting at least one image group having a frame rate based on an estimated motion amount; and a step of generating a high-resolution video by performing weighted averaging of an image group obtained by performing video super-resolution on the selected image group.

Aspects of a second embodiment include the video super-resolution method according to the first embodiment, wherein the step of performing motion estimation includes performing motion estimation on a region basis, a block basis, or a pixel basis in an image of the image group, the step of selecting includes selecting at least one frame rate based on a motion amount estimated on the region basis, the block basis, or the pixel basis in the image of the image group, and the step of generating a high-resolution video includes generating the high-resolution video by performing weighted averaging of an image group obtained by performing video super-resolution on the image group having the frame rate selected on the region basis, the block basis, or the pixel basis in the image of the image group.

Aspects of a third embodiment include a video super-resolution program causing a computer to function as: a creating unit configured to create image groups having different frame rates from an input video; an estimating unit configured to perform motion estimation for each of the created image groups; a selecting unit configured to select at least one image group having a frame rate based on an estimated motion amount; and an averaging unit configured to generate a high-resolution video by performing weighted averaging of an image group obtained by performing video super-resolution on the selected image group.

Aspects of a fourth embodiment include the video super-resolution program according to the third embodiment, wherein the estimating unit performs motion estimation on a region basis, a block basis, or a pixel basis in an image of the image group, the selecting unit selects at least one frame rate based on a motion amount estimated on the region basis, the block basis, or the pixel basis in the image of the image group, and the generating unit generates the high-resolution video by performing weighted averaging of an image group obtained by performing video super-resolution on the image group having the frame rate selected on the region basis, the block basis, or the pixel basis in the image of the image group.

Aspects of a fifth embodiment include a video super-resolution device including: a creating unit configured to create image groups having different frame rates from an input video; an estimating unit configured to perform motion estimation for each of the created image groups; a selecting unit configured to select at least one image group having a frame rate based on an estimated motion amount; and an averaging unit configured to generate a high-resolution video by performing weighted averaging of an image group obtained by performing video super-resolution on the selected image group.

Aspects of a sixth embodiment include the video super-resolution device according to the fifth embodiment, wherein the estimating unit performs motion estimation on a region basis, a block basis, or a pixel basis in an image of the image group, the selecting unit selects at least one frame rate based on a motion amount estimated on the region basis, the block basis, or the pixel basis in the image of the image group, and the generating unit generates the high-resolution video by performing weighted averaging of an image group obtained by performing video super-resolution on the image group having the frame rate selected on the region basis, the block basis, or the pixel basis in the image of the image group.

According to the embodiments, a stable feature improvement can be achieved even in a super-high frame rate video.

BRIEF DESCRIPTION OF THE DRAWINGS

FIG. 4 is a schematic diagram for describing an example of learning (training) of video super-resolution;

FIG. 13 is a table illustrating a recent trend of cameras, smartphones, and image sensors for consumer applications.

DETAILED DESCRIPTION

Figure 1:
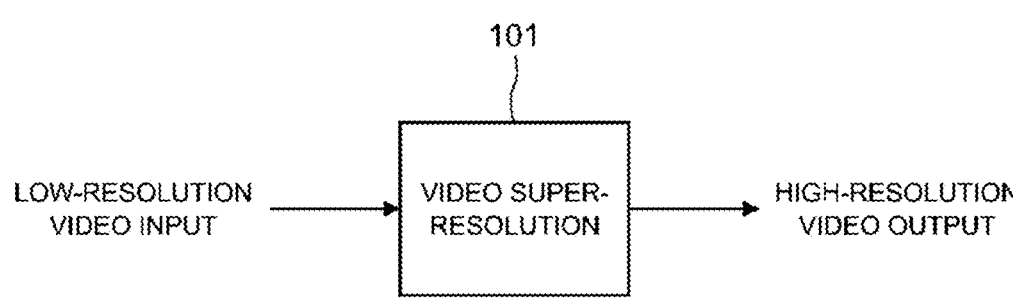
FIG. 1 is a block diagram illustrating input and output of a video super-resolver.

FIG. 1 is a block diagram illustrating input and output of a video super-resolution device.

A video super-resolver 101 of the video super-resolution device receives a low-resolution video as input, and outputs a high-resolution video.

Figure 2:
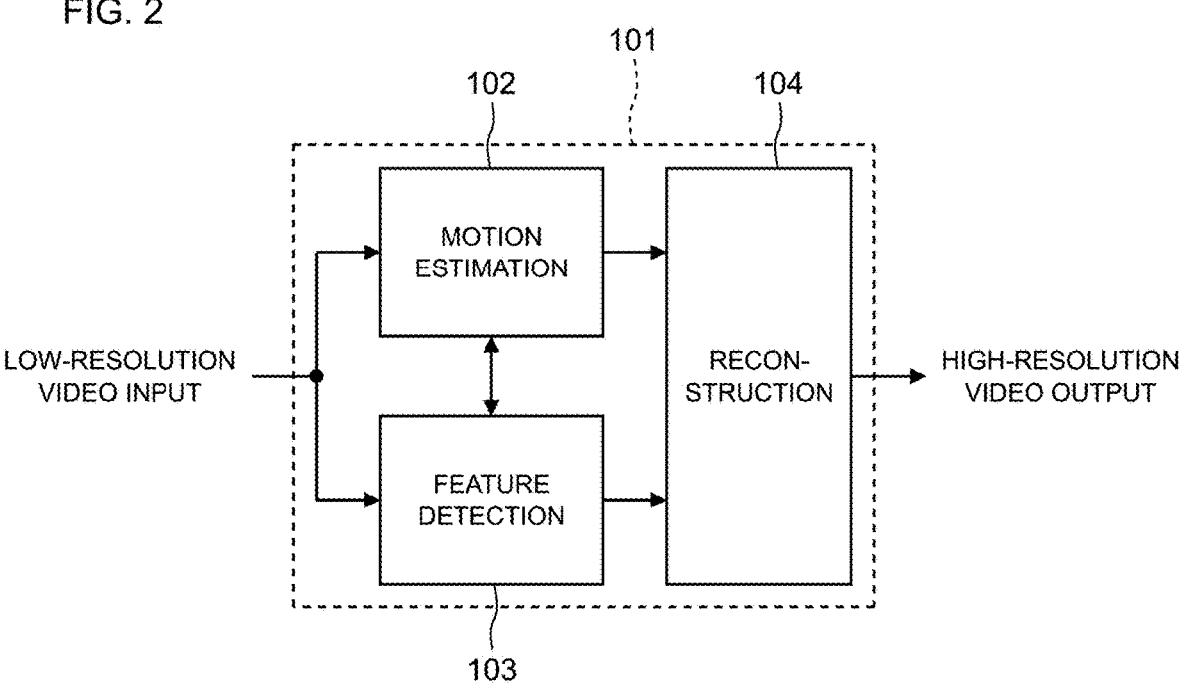
FIG. 2 illustrates a typical configuration example of a video super-resolution device using recent deep learning.

FIG. 2 illustrates a typical configuration example of the video super-resolution device using recent deep learning (H. Liu et al.: "Video super-resolution based on deep learning: a comprehensive survey", Artificial Intelligence Review, Vol. 55, pp. 5981-6035 April 2022).

The video super-resolver 101 of the video super-resolution device of H. Liu et al.: "Video super-resolution based on deep learning: a comprehensive survey", Artificial Intelligence Review, Vol. 55, pp. 5981-6035 April 2022. includes a motion estimator 102, a feature detector 103, and a reconstructor 104. The motion estimator 102 estimates an optical flow between frames. The feature detector 103 detects an image feature amount such as attention. The reconstructor 104 uses the optical flow obtained by the motion estimator 102 and the image feature amount obtained by the feature detector 103 to generate a high-resolution video.

Figure 3:
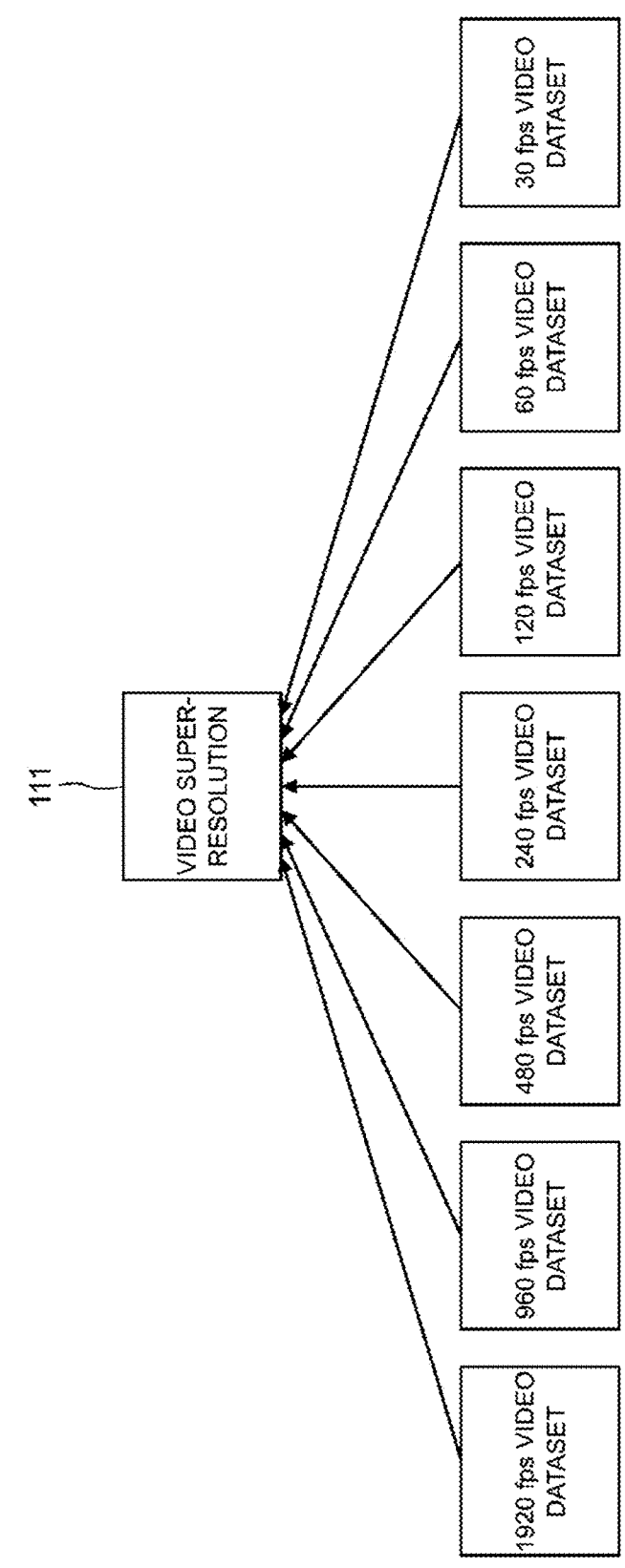
FIG. 3 is a schematic diagram for describing an example of learning (training) of video super-resolution.
Figure 4:
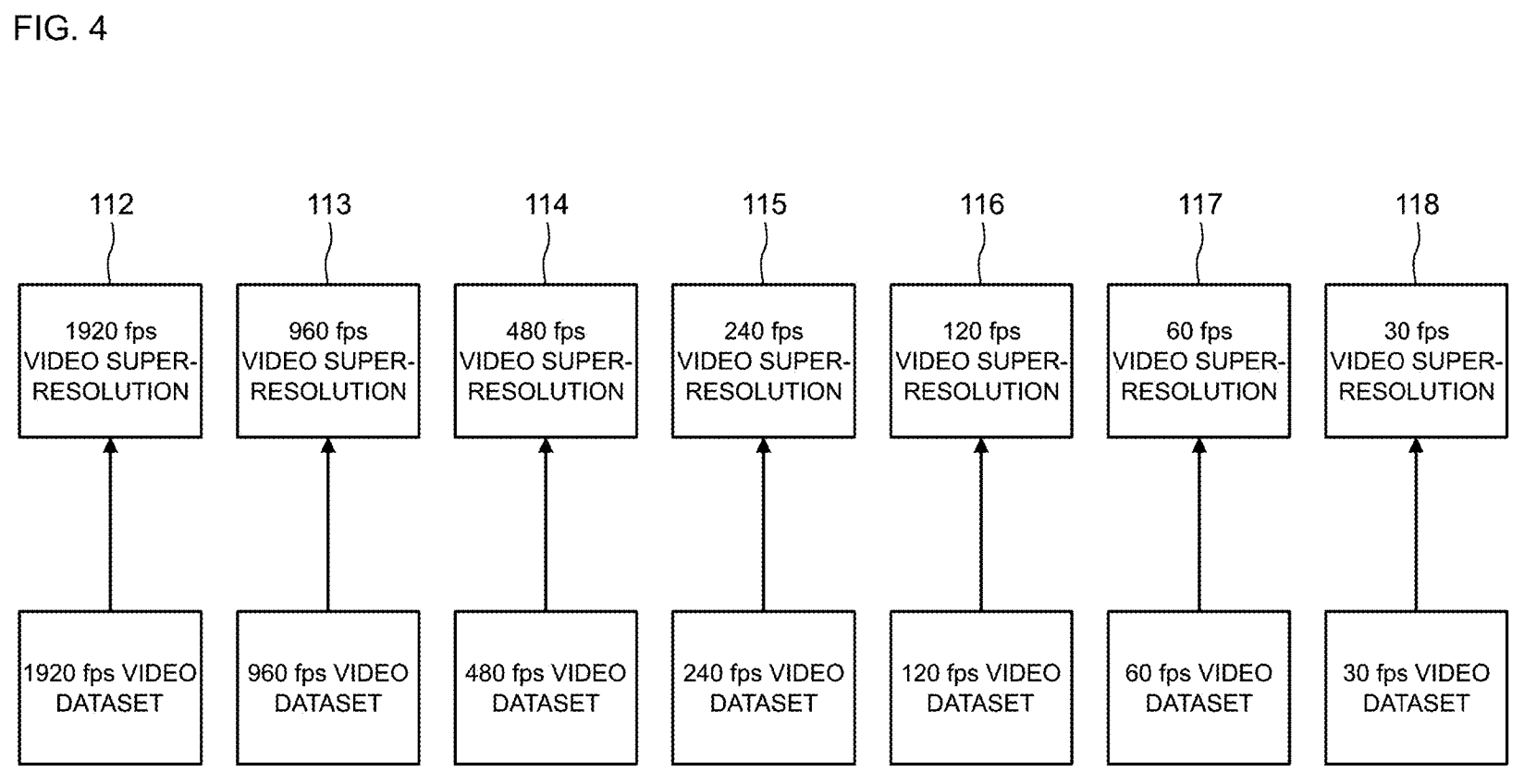

FIGS. 3 and 4 are schematic diagrams for describing an example of learning (training) of video super-resolution, respectively.

In FIG. 3, a video super-resolver 111 is trained without considering a frame rate. In FIG. 4, a dataset for each video having a different frame rate is created, and video super-resolvers 112 to 118 are trained. After completion of the training of the video super-resolvers by preparing a pair of a low-resolution video and a high-resolution video (correct videos), the video super-resolvers 111 to 118 receive an unknown low-resolution video as input, and generate a high-resolution video as inference. The optical flow has a smaller value as the frame rate is higher. Thus, the learning method in FIG. 4 can normally achieve video super-resolution with higher accuracy than the learning method in FIG. 3.

Figure 5:
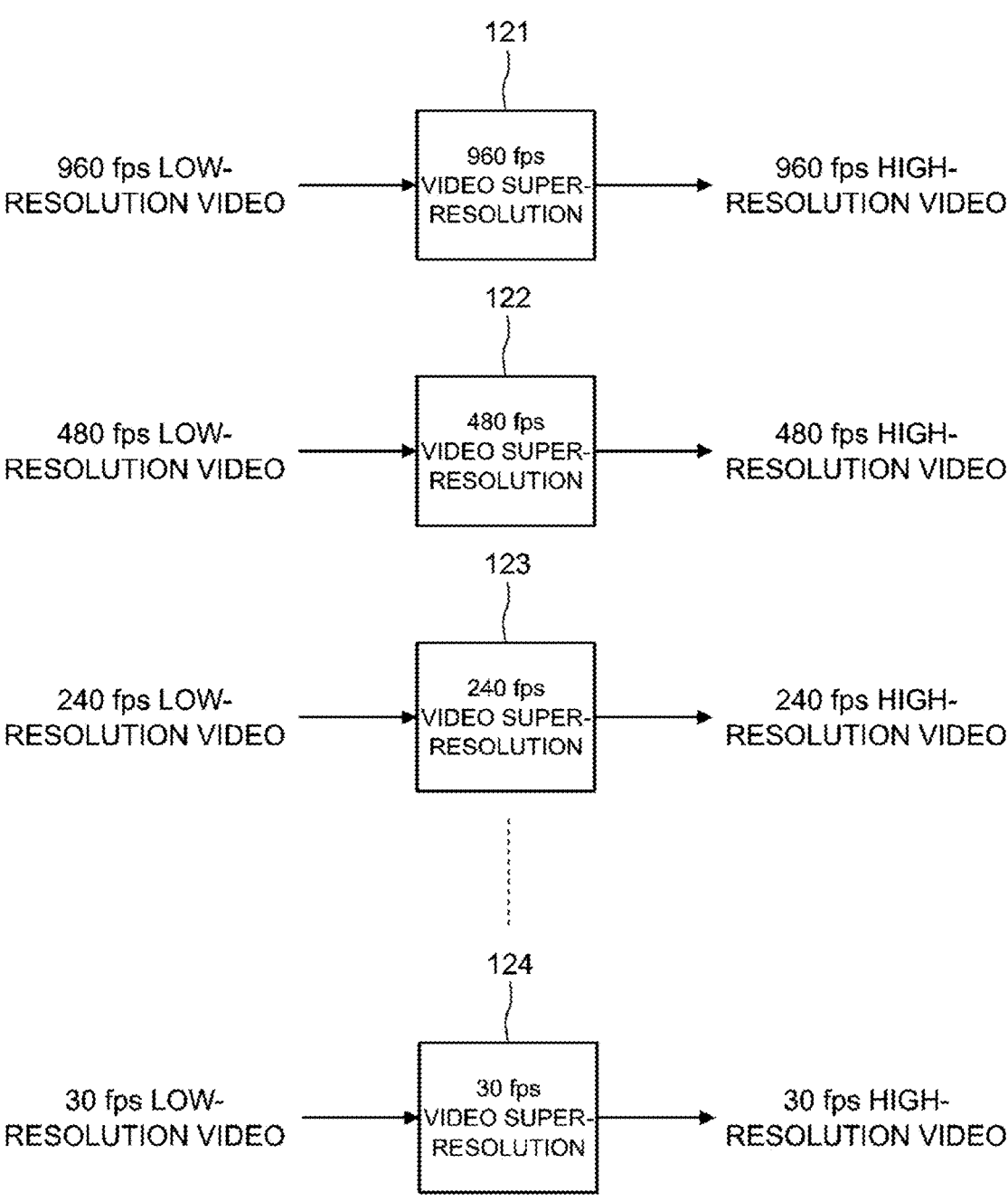
FIG. 5 is a schematic diagram for describing a state in which video super-resolution is performed on each video having a different frame rate as an inference step after completion of the training in FIG. 4.

FIG. 5 is a schematic diagram for describing a state in which video super-resolution is performed on each video having a different frame rate as an inference step after completion of the training in FIG. 4.

Here, a video super-resolver 121 is a video super-resolver trained with a 960 fps video group, a video super-resolver 122 is a video super-resolver trained with a 480 fps video group, a video super resolver 123 is a video super-resolver trained with a 240 fps video group, and a video super resolver 124 is a video super-resolver trained with a 30 fps video group.

Figure 6:
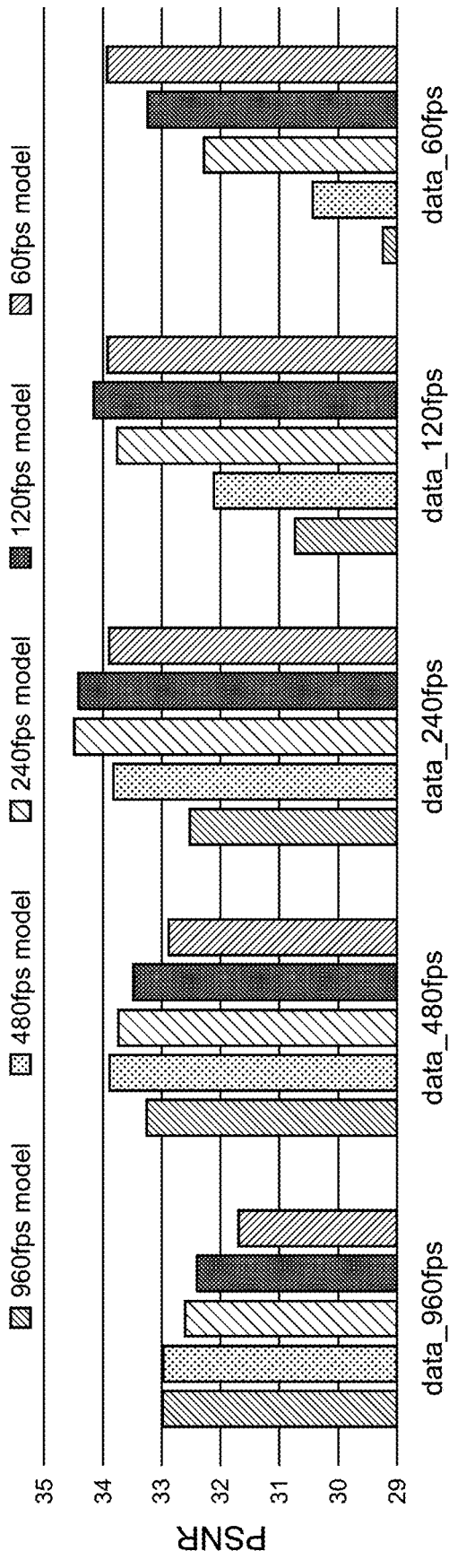
FIG. 6 is a graph illustrating a feature evaluation example of video super-resolution in a case where a high-resolution video is generated for each frame rate.

FIG. 6 is a graph illustrating a feature evaluation example of video super-resolution in a case where a high-resolution video is generated for each frame rate.

Comparison of PSNRs is shown in a case where video datasets having frame rates of 60 fps, 120 fps, 240 fps, 480 fps, and 960 fps, and video super-resolvers trained with video datasets having frame rates of 60 fps, 120 fps, 240 fps, 480 fps, and 960 fps are prepared, and a high-resolution video is generated for all combinations of the frame rates (60 fps, 120 fps, 240 fps, 480 fps, 960 fps) of a low-resolution video as input and the frame rates (60 fps, 120 fps, 240 fps, 480 fps, 960 fps) used for training the video super-resolvers.

From this result, the following tendency can be obtained.

(1) As a result for each frame rate, the best PSNR is obtained when the frame rate of the input video matches the frame rate used for training the video super-resolvers at all the frame rates.

(2) However, as the overall PSNR from a low frame rate to a high frame rate, the PSNR increases as the frame rate increases to 60 fps, 120 fps, and 240 fps, but the PSNR decreases as the frame rate further increases to 480 fps and 960 fps.

H. Sim, J. Oh, and M. Kim: "XVFI: eXtreme Video Frame Interpolation", IEEE ICCV 2021 November 2021. discloses that the performance of frame interpolation increases as the frame rate increases. However, the result of FIG. 6 shows that the performance of video super-resolution decreases reversely.

In order to describe this phenomenon, the basic principle of video super-resolution will be described with reference to FIGS. 7 and 8.

Figure 7:
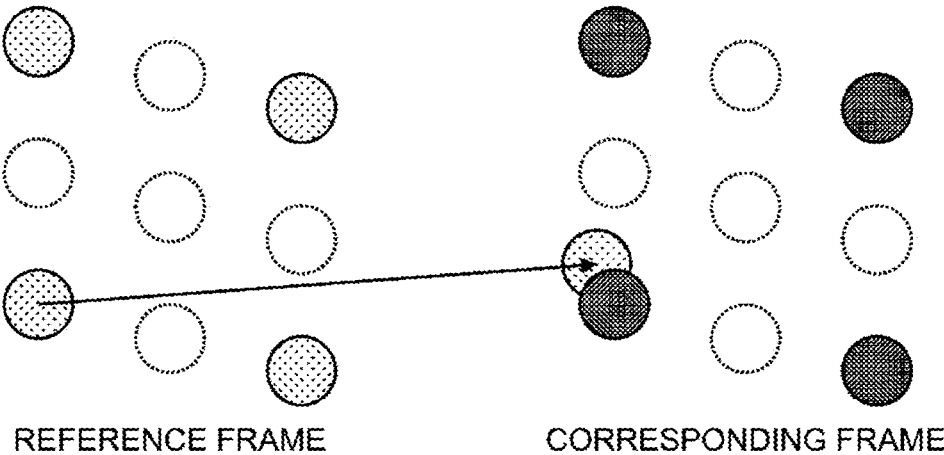
FIG. 7 is a schematic diagram for describing the principle of video super-resolution with a motion amount between different frames.
Figure 8:
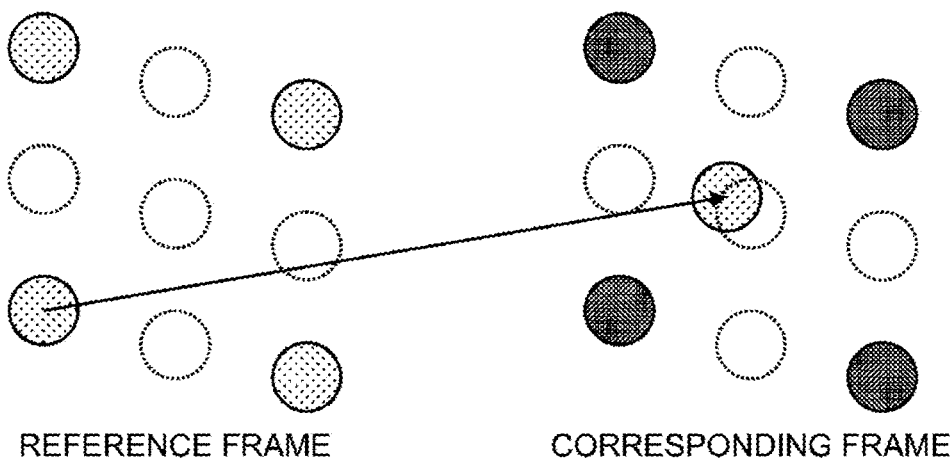
FIG. 8 is a schematic diagram for describing the principle of video super-resolution with a motion amount between different frames.

FIGS. 7 and 8 are schematic diagrams for describing the principle of video super-resolution with a motion amount between different frames.

A circle indicated by a dotted line in a corresponding frame indicates a pixel at a half-pixel (0.5-pixel) position, and the purpose of super-resolution is to accurately estimate the value of this pixel. In the case of video super-resolution, when there is a pixel shifted by half a pixel in a reference frame by motion estimation, ideal super-resolution can be achieved. In addition, although FIGS. 7 and 8 illustrate only one direction, the reference frame can be used in each of a past direction and a future direction. Thus, as long as a pixel shifted by half a pixel is found in the reference frame, the video super-resolution is expected to be appropriately operated by the motion estimation. However, FIG. 7 illustrates a case where the motion amount is very small. In this case, it is expected that favorable super-resolution cannot be achieved. The optical flow has a smaller value as the frame rate is higher. Thus, it is expected that the case of FIG. 7 frequently occurs in a high frame rate video at 240 fps or more. On the other hand, FIG. 8 illustrates a case where a reference pixel having a motion amount of approximately half a pixel is found. In this case, favorable super-resolution is expected to be achieved.

Figure 9:
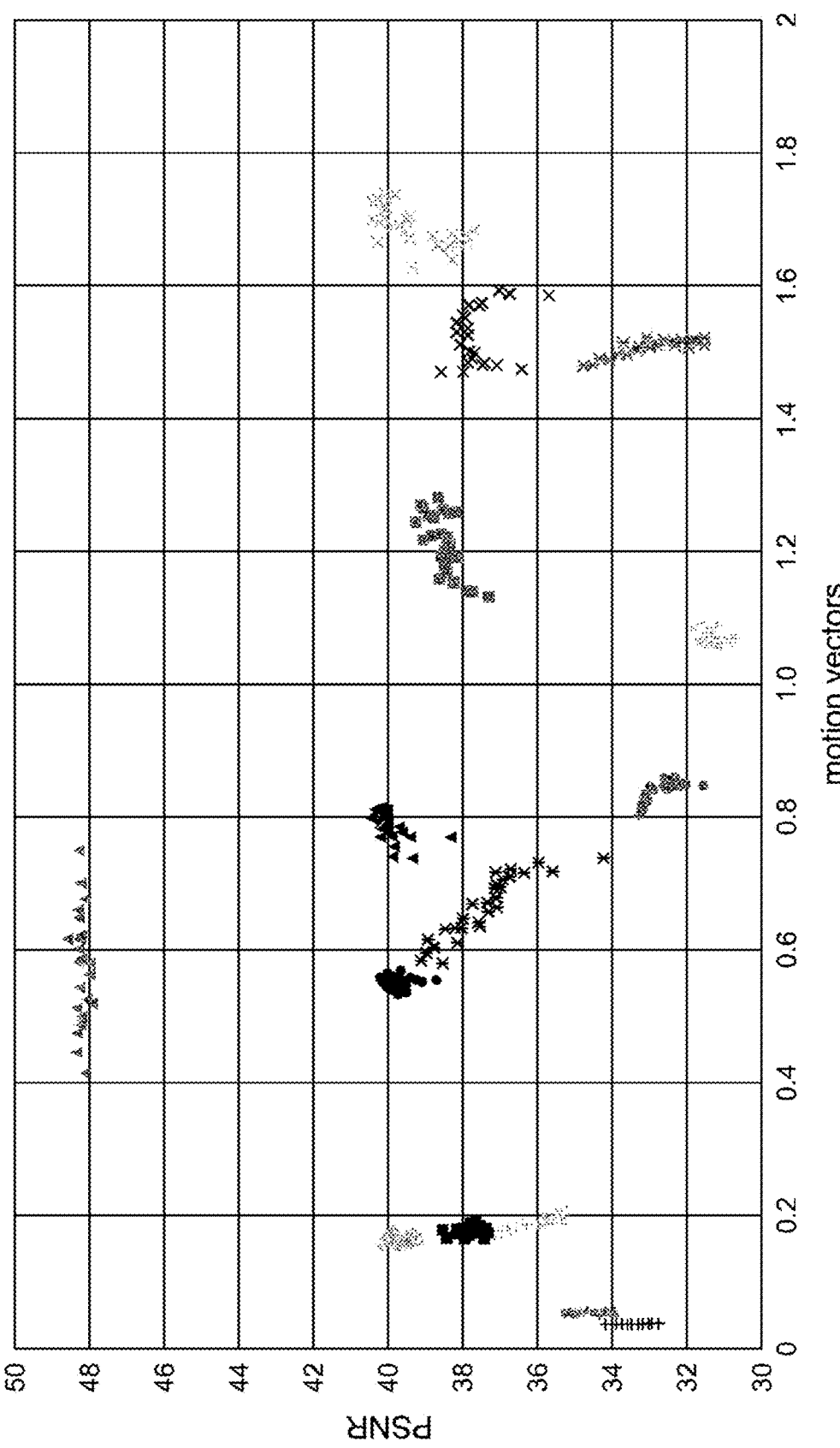
FIG. 9 is a graph illustrating a feature evaluation example of video super-resolution for each motion amount.

FIG. 9 is a graph illustrating a feature evaluation example of video super-resolution for each motion amount.

FIG. 9 illustrates, as a distribution, a relationship between the magnitude of an optical flow and the PSNR of super-resolution in a 960 fps video. From this result, as expected above, a favorable PSNR is obtained when the optical flow value is around 0.5 pixels. On the other hand, in cases where the optical flow value is small and where the value is a large value exceeding 1 pixel, it can be seen that a video super-resolution effect is small.

Based on the above consideration, a first embodiment will be described.

First Embodiment (Configuration of Video Super-Resolution Device)

Figure 10:
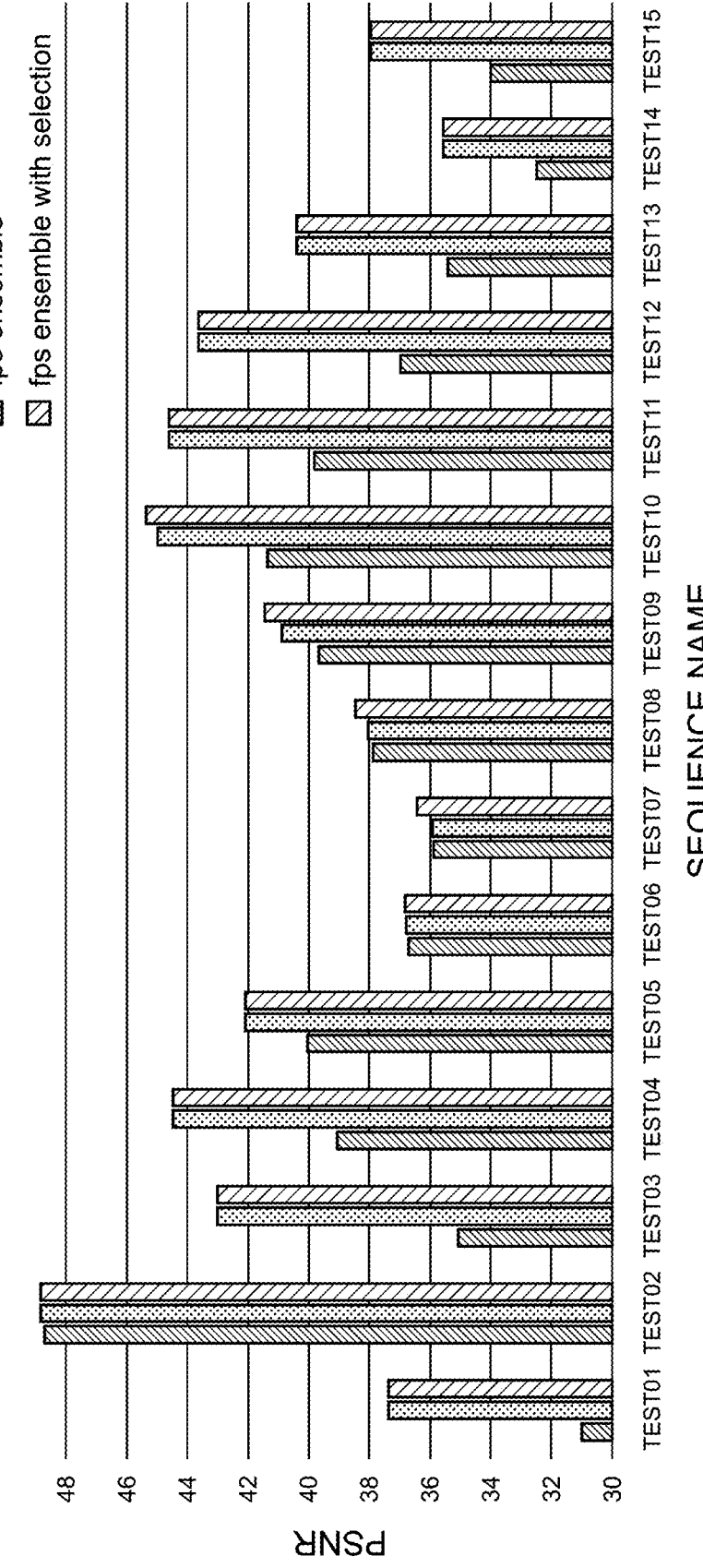
FIG. 10 is a block diagram illustrating a configuration example of a video super-resolution device according to a first embodiment.

FIG. 10 is a block diagram illustrating a configuration example of a video super-resolution device according to the first embodiment.

The video super-resolution device includes a down-sampler 131, video super-resolvers 132 to 135, and a selecting/averaging unit 136. The down-sampler 131 divides an input low-resolution video into a plurality of frame rates. The video super-resolvers 132 to 135 are video super-resolvers trained at different frame rates, and perform super-resolution of the low-resolution video. The selecting/averaging unit 136 selects a video super-resolver according to the magnitude of an optical flow obtained as a result of video super-resolution. Specifically, in a case where the optical flow has a value smaller than 0.5 pixels, the selecting/averaging unit 136 makes selection such as not adopting a result of video super-resolution at a high frame rate. Finally, the selecting/averaging unit 136 obtains a mean value of the selected video super-resolution result, and outputs a final high-resolution video.

Figure 11:
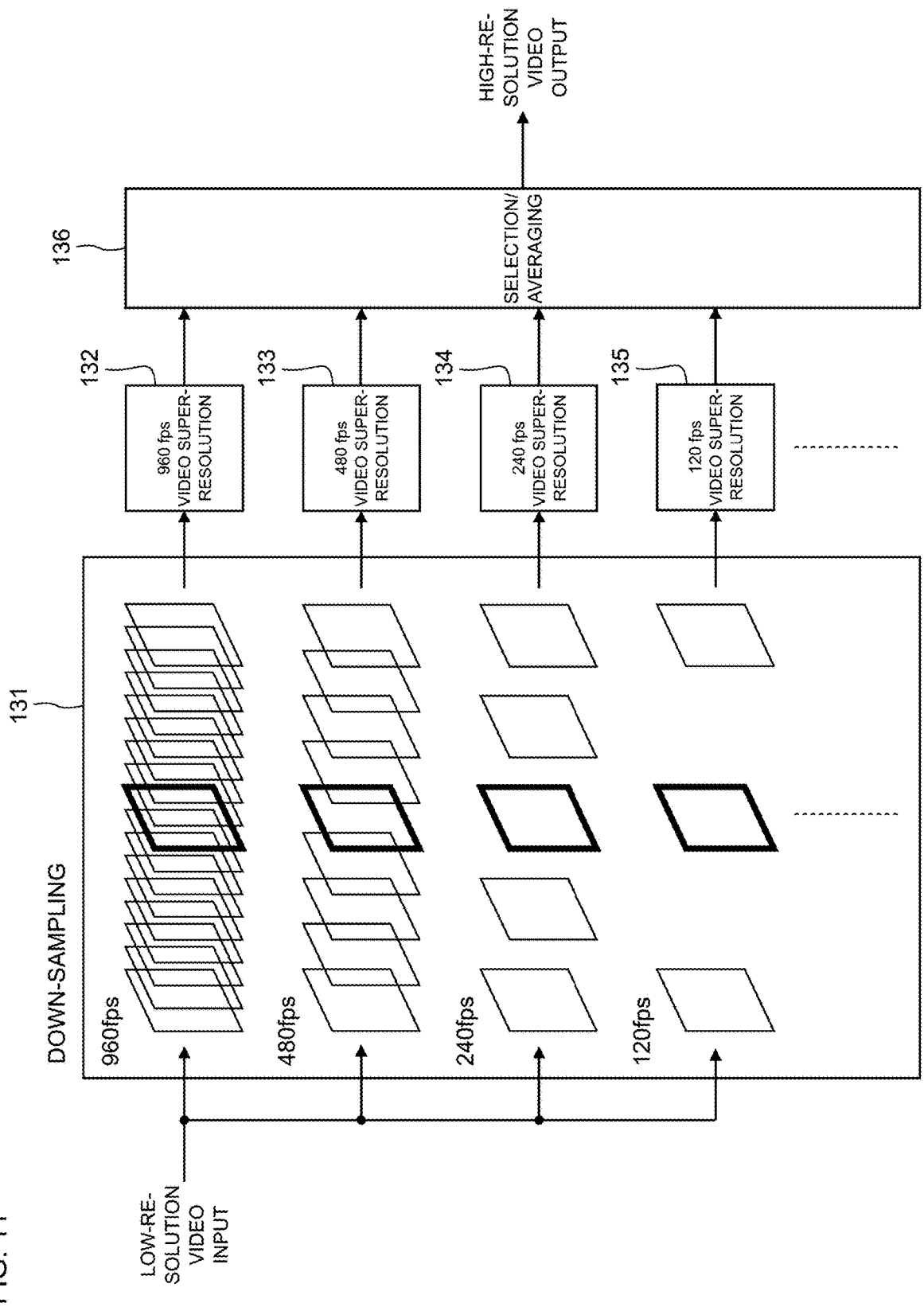
FIG. 11 is a graph illustrating an example of results of video super-resolution of the video super-resolution device according to the first embodiment.

FIG. 11 is a graph illustrating an example of results of video super-resolution of the video super-resolution device according to the first embodiment.

FIG. 11 illustrates comparison of PSNRs of high-resolution videos in a case where a 960 fps low-resolution video is input and video super-resolution is performed by three methods. In the first method (original), only the video super-resolver trained at 960 fps is used. In the second method (fps ensemble), only averaging is performed without performing selection by the selecting/averaging unit 136 in FIG. 10. In the third method (fps ensemble with selection), selection and averaging are performed by the selecting/averaging unit 136 in FIG. 10. It can be seen that the video super-resolution problem illustrated in FIG. 6 can be solved by the second and third methods. In addition, as comparison between the second method and the third method, it can be seen that the PSNR can be improved by not using the result of the frame rate at which the optical flow is too small.

Effects of First Embodiment

According to the first embodiment described above, the video super-resolvers trained at different frame rates are prepared, and the video super-resolver is selected according to the magnitude of the optical flow. Therefore, a stable feature improvement can be achieved even in a super-high frame rate video.

Note that the selecting/averaging unit 136 may not only select one video super-resolver but also output a weighted mean of a plurality of video super-resolvers.

Second Embodiment

Figure 12:
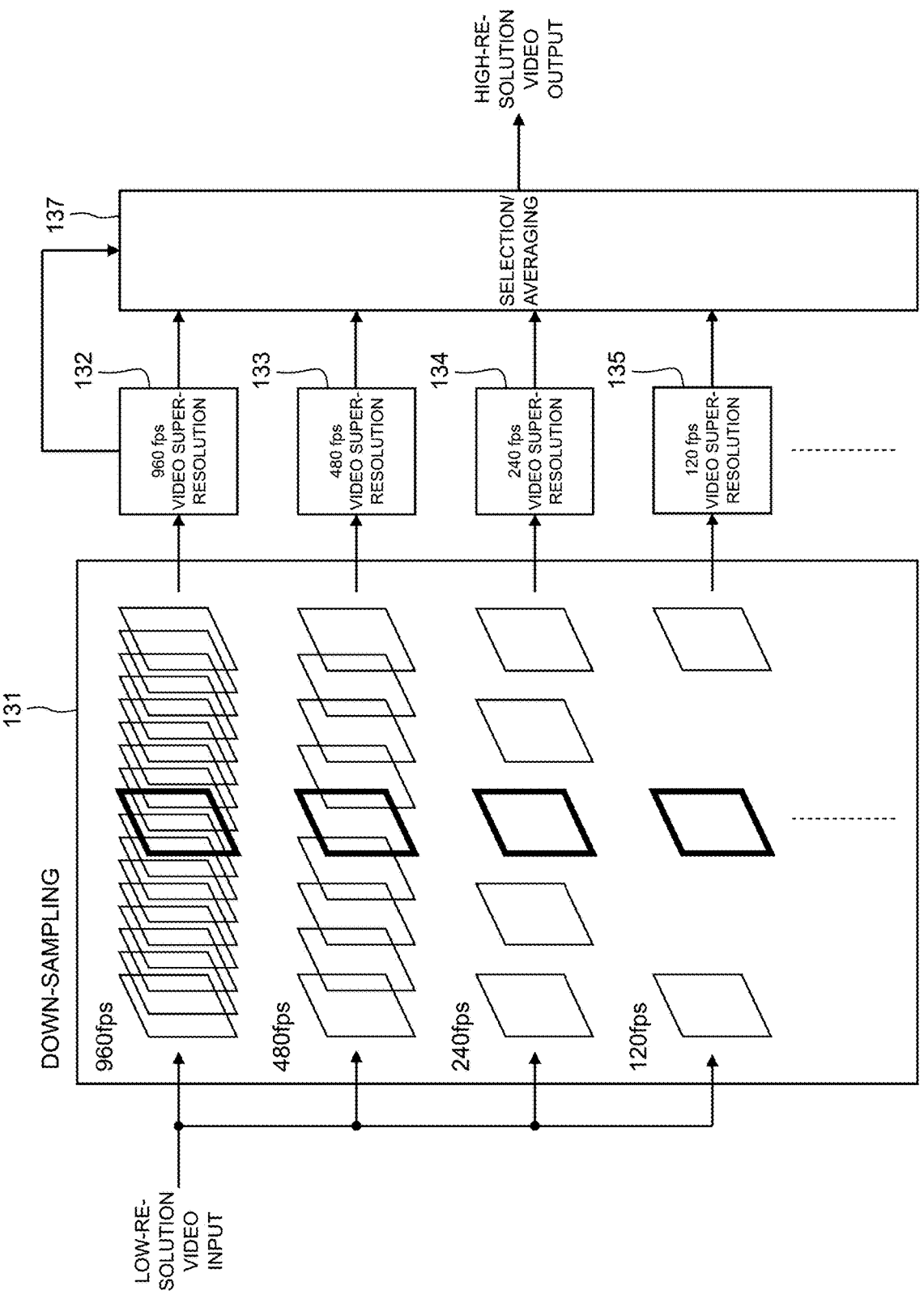
FIG. 12 is a block diagram illustrating a configuration example of a video super-resolution device according to a second embodiment.

FIG. 12 is a block diagram illustrating a configuration example of a video super-resolution device according to a second embodiment.

The video super-resolution device includes a down-sampler 131, video super-resolvers 132 to 135, and a selecting/averaging unit 137.

A difference from the first embodiment in FIG. 10 is the selecting/averaging unit 137, which uses the image feature amount output from of the feature detector 103 in addition to the optical flow output from the motion estimator 102 in FIG. 2, and performs selection/averaging on a region basis, a block basis, or a pixel basis in an image.

Effects of Second Embodiment

According to the second embodiment described above, the video super-resolvers trained at different frame rates are prepared, the video super-resolver is selected according to the magnitude of the optical flow on a region basis, a block basis, or a pixel basis in the image, and the selection and averaging are performed. Therefore, a further feature improvement can be achieved on the basis of the feature amount of the image as compared with the first embodiment.

Other Embodiments

The present invention is not limited to the above embodiments, and various modifications can be made without departing from the gist of the present invention.

All or some of the functions of the above embodiments may be realized by a program, or may be realized by dedicated hardware for each function or hardware such as ASIC. In addition, in a case where each function is realized by a program, the program can be provided by being stored in a recording medium such as a nonvolatile memory or a CD-ROM. Replacement, deletion, addition, and the like of the above steps described in the above embodiments can be made within the scope not changing the gist of the present invention.

Moreover, each function is not necessarily realized on one device, and may be shared and realized on a plurality of devices within the scope not changing the gist of the present invention.

As described above, the of the present invention allow for favorable super-resolution of a super-high frame rate video exceeding 240 fps in a system that performs super-resolution of a video signal.

What is claimed is:

1. A video super-resolution method comprising:

creating image groups having different frame rates from an input video;

performing motion estimation for each of the created image groups;

selecting at least one image group having a frame rate based on an estimated motion amount;

obtaining a super-resolved image group by performing video super-resolution on the selected image group; and generating a high resolution video by performing weighted averaging of the super-resolved image group.

2. The video super-resolution method according to claim 1, the step of performing motion estimation further comprising performing motion estimation on a region basis, a block basis, or a pixel basis in an image of the image group;

the step of selecting further comprising selecting at least one frame rate based on a motion amount estimated on the region basis, the block basis, or the pixel basis in the image of the image group, and the step of obtaining the super-resolved image group further comprising performing video super-resolution on the selected image group having the frame rate selected on the region basis, the block basis, or the pixel basis in the image of the image group.

3. A non-transitory machine readable medium containing instructions for video super resolution that, when executed, direct one or more processors to:

create image groups having different frame rates from an input video;

perform motion estimation for each of the created image groups;

select at least one image group having a frame rate based on an estimated motion amount;

obtain a super-resolved image group by performing video super-resolution on the selected image group; and generate a high-resolution video by performing weighted averaging of the super-resolved image group.

4. The non-transitory machine readable medium according to claim 3, the instructions further comprise, when executed, direct one or more processor to:

perform motion estimation on a region basis, a block basis, or a pixel basis in an image of the image group, select at least one frame rate based on a motion amount estimated on the region basis, the block basis, or the pixel basis in the image of the image group, and obtaining the super-resolved image group by performing video super-resolution on the selected image group having the frame rate selected on the region basis, the block basis, or the pixel basis in the image of the image group.

5. A video super-resolution device comprising:

a creating unit configured to create image groups having different frame rates from an input video;

an estimating unit configured to perform motion estimation for each of the created image groups;

a selecting unit configured to select at least one image group having a frame rate based on an estimated motion amount; and an averaging unit configured to generate a high-resolution video by performing weighted averaging of a super-resolved image group obtained by performing video super-resolution on the selected image group.

6. The video super-resolution device according to claim 5, wherein the estimating unit performs motion estimation on a region basis, a block basis, or a pixel basis in an image of the image group, the selecting unit selects at least one frame rate based on a motion amount estimated on the region basis, the block basis, or the pixel basis in the image of the image group, and the generating unit generates the high-resolution video by performing weighted averaging of a super-resolved image group obtained by performing video super-resolution on the selected image group having the frame rate selected on the region basis, the block basis, or the pixel basis in the image of the image group.

* * * * *